(12) United States Patent
Binqi et al.

(10) Patent No.: US 10,927,027 B2
(45) Date of Patent: *Feb. 23, 2021

(54) ELECTROMAGNETIC-FORCE-BASED DEWATERING FOR SEWAGE SLUDGE REDUCTION

(71) Applicant: China Jiliang University, Zhejiang (CN)

(72) Inventors: Rao Binqi, Zhejiang (CN); Xu Peng, Zhejiang (CN); Lu Xilong, Zhejiang (CN); Dong Wenjie, Zhejiang (CN); Zhang Jicheng, Zhejiang (CN); Yan Wei, Zhejiang (CN); Liu Wei, Zhejiang (CN); Wang Gongqin, Zhejiang (CN)

(73) Assignee: China Jiliang University, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,044

(22) Filed: Oct. 21, 2019

(65) Prior Publication Data
US 2020/0048132 A1    Feb. 13, 2020

Related U.S. Application Data

(63) Continuation of application No. 15/947,606, filed on Apr. 6, 2018, now Pat. No. 10,494,285.

(30) Foreign Application Priority Data

Jun. 3, 2017  (CN) .......................... 201710410609.X

(51) Int. Cl.
*C02F 11/122* (2019.01)
*B01D 25/164* (2006.01)
(Continued)

(52) U.S. Cl.
CPC .......... *C02F 11/122* (2013.01); *B01D 25/164* (2013.01); *B01D 25/172* (2013.01);
(Continued)

(58) Field of Classification Search
CPC ........ C02F 11/122; C02F 1/48; B01D 25/172; B01D 25/164; B01D 35/06; B01D 25/287; B01D 25/284; B01D 25/19
See application file for complete search history.

(56) References Cited

U.S. PATENT DOCUMENTS 10,494,285 B2 * 12/2019 Binqi .................. B01D 25/164
2004/0149649 A1   8/2004 Uchiyama

* cited by examiner

*Primary Examiner* — Chester T Barry
(74) *Attorney, Agent, or Firm* — Kunzler Bean & Adamson; Scott D. Thorpe

(57) ABSTRACT

For sewage sludge reduction, an apparatus includes a front-end auxiliary filter plate, a back-end auxiliary filter plate, and a plurality of filter plate modules disposed between the front-end auxiliary filter plate and the back-end auxiliary filter plate. Each filter plate module includes a middle main filter plate, a middle auxiliary filter plate, and a plurality of electromagnetic modules comprising an electromagnetic coil wound around an electromagnetic core. The middle main filter plate and the middle auxiliary filter plate are disposed at opposite sides of the electromagnetic modules. A plurality of microwave generators send microwaves through microwave acting channels to irradiate the sewage sludge. An electric current is applied to the electromagnetic coil, attracting the middle auxiliary filter plates and the main filter plates and applying pressure to the sewage sludge.

18 Claims, 4 Drawing Sheets

(51) Int. Cl.
*B01D 35/06* (2006.01)
*B01D 25/28* (2006.01)
*B01D 25/172* (2006.01)
*C02F 1/48* (2006.01)

(52) U.S. Cl.
CPC ......... *B01D 25/284* (2013.01); *B01D 25/287* (2013.01); *B01D 35/06* (2013.01); *C02F 1/48* (2013.01); *C02F 2303/06* (2013.01)

ELECTROMAGNETIC-FORCE-BASED DEWATERING FOR SEWAGE SLUDGE REDUCTION

CROSS-REFERENCE TO RELATED APPLICATIONS

This application is a continuation-in-part application which claims priority to U.S. patent application Ser. No. 15/947,606 entitled "ELECTROMAGNETIC-FORCE-BASED DEWATERING APPARATUS FOR SEWAGE SLUDGE REDUCTION" and filed on Apr. 6, 2018, now U.S. Pat. No. 10,494,285, the entire contents of which are incorporated herein by reference for all purposes, which claims priority to Chinese State Intellectual Patent Application Number 201710410609.X entitled "ELECTROMAGNETIC-FORCE-BASED DEWATERING APPARATUS FOR SEWAGE SLUDGE REDUCTION" and filed on Jun. 3, 2017 for Rao Bingqi, the entire contents of which are incorporated herein by reference for all purposes. See MPEP § 201.14.

FIELD

The subject matter disclosed herein relates generally to a dewatering apparatus, and more particularly, to an electromagnetic-force-based dewatering apparatus for sewage sludge reduction.

BACKGROUND

Description of the Related Art

Pressure is used to dewater sludge.

BRIEF SUMMARY

The technical solution of the invention is providing an electromagnetic-force-based dewatering apparatus for sewage sludge reduction, and the apparatus comprises a front-end auxiliary filter plate, a back-end auxiliary filter plate, middle main filter plates, middle auxiliary filter plates, electromagnetic cores and electromagnetic coils wound around the corresponding cores, wherein the electromagnetic core and the electromagnetic coil make up an electromagnetic module; the outer side of the front-end filter plate is provided with the plurality of electromagnetic modules and so is the inner side of the back-end auxiliary filter plate; a plurality of filter plate modules are disposed between the front-end auxiliary filter plate and the back-end auxiliary filter plate; each of the filter plate modules includes a middle main filter plate, a middle auxiliary filter plate and the plurality of electromagnetic modules; the middle main filter plate and the middle auxiliary filter plate are disposed at opposite sides of the electromagnetic modules; the middle main filter plates of the plurality of filter plate modules face the front-end filter plate, and the middle auxiliary filter plates of the plurality of filter plate modules face the back-end filter plate and there is a consistent one-to-one match between the main filter plates and the auxiliary filter plates, forming a plurality of filter chambers into which sewage sludge go via sludge inlet pipes.

The front-end auxiliary filter plate, the middle main filter plates, the middle auxiliary filter plates and the back-end auxiliary filter plate are connected in turn through link mechanisms and can achieve a linkage motion under electromagnetic force.

Each of the outer rings of the middle main filter plates is provided with a seal ring, and the reinforced substrate cloth and the filter cloth are disposed in turn on the middle main filter plate from interior to exterior.

A plurality of intake branch pipes is connected with the intake main pipe; the plurality of intake branch pipes is correspondingly connected with the plurality of the filter chambers so that the high-pressure gas from intake branch pipes enters the corresponding filter chambers.

Drainpipes of filter plates for discharging the filtered water are disposed on the front-end auxiliary filter plate and each of the middle main and auxiliary filter plates.

The link mechanism comprises main connecting rods and auxiliary connecting rods, the main connecting rods are disposed on the rotating shafts of the middle auxiliary filter plates in the odd positions; the auxiliary connecting rods are disposed on the rotating shafts of the middle auxiliary filter plates in the even positions; the main and auxiliary connecting rods are connected by hinge.

The middle auxiliary filter plate in the odd positions is also provided with a retention device, and the retention device comprises an electromagnetic core of limit block, an electromagnetic coil of limit block, a spring baffle, a reset spring, a sliding rail and a sliding block; the sliding rail is fixed on the middle filter plate to ensure that the sliding block extended accurately limits the angle of rotation of the main connecting rod, indirectly limiting the distance between the middle auxiliary filter plate and the middle main filter plate; the electromagnetic core of limit block is fixed on the sliding block; the spring baffle is fixed on the sliding rail; the reset spring is used for connecting the sliding block and the sliding rail.

The back of the sliding block is made of magnetic material; when the coil of limit block is energized, the sliding block and the sliding rail are in relative motion, and the reset spring is compressed, and the front end of the sliding block extends out with the main connecting rod stuck.

The dewatering apparatus also comprises a dust collector that absorbs and removes sludge dust via negative pressure.

Compared with the existing technology, the present invention with the above structure has the following advantages:

(1) With the aid of the strong pressing force from electromagnetic field, the sludge can be squeezed without hydraulics. In addition, by changing the current direction of electromagnetic coils, the suction of electromagnet will be changed into repulsion and the filter plates will be pulled out automatically with no need for a plate puller;

(2) The middle auxiliary filter plate, the middle main filter plate, the sealing ring, the reinforced substrate cloth and the filter cloth form an enclosed variable volume chamber for compressing sludge with no need for some wearing parts like spring or diaphragm, improving the reliability and service life of the equipment;

(3) The feed pump is a high-pressure plunger pump whose pressure is applied on sludge for the primary filtering and dewatering; then increasing the current of coils and increasing the electromagnetic force, the pressure between the middle main plate and the middle auxiliary filter plate is gradually increased for the secondary filtering and dewatering;

(4) Because some of the water in the sludge cannot be mechanically removed, the apparatus uses the high pressure gas generator and its components to generate high pressure gas by which the water in the sludge that is difficult to be mechanically removed is taken away, i.e., the dual effect of

DETAILED DESCRIPTION

Figure 1:
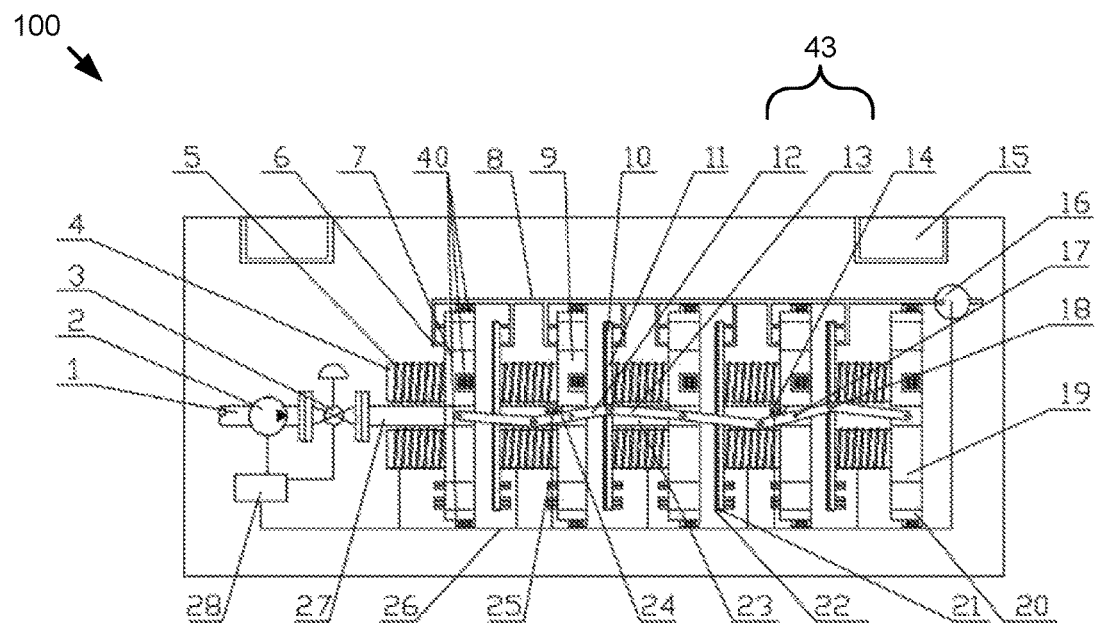
FIG. 1 is a front view of an electromagnetic-force-based dewatering apparatus for sewage sludge reduction according to an embodiment of the present invention.

In prior art, advanced sludge dewatering is done with the diaphragm type plate and frame filter press that has low dewatering efficiency, and the pressing pressure is only 1.6 megapascal (MPa). The diaphragm type plate and frame filter press uses a high-pressure pump to inject water into the inside of the diaphragm plate frame and expand the diaphragm to reduce the size of the filter chamber. The plastic deformation of the diaphragm plate frame produces an extrusion process. The diaphragm plate frame has a low compression ratio and a long working period. Additionally, in terms of the structures of the common elastic press plate frames available on the market, the filter plates are all integral injection molded parts that are easily damaged and deformed, and expensive to replace. The diaphragm type plate and frame filter press may reduce the moisture content of produced sludge cake to about 60% that is much lower than those of the previous plate and frame filter presses, mostly because the diaphragm expands resulting in a second dewatering, that is, the sludge filter-pressure chamber is a variable volume one, but the equipment requires the addition of lime and ferric chloride that equal about 25-30% of the absolute dry sludge in weight, greatly increasing the amount of the sludge, and detrimental effects on the subsequent sludge treatment and disposal will be brought due to the added lime and ferric chloride and the like, which is not in conformity with the principle of reduction and harmlessness.

There is also an ultrahigh pressure elastic filter press that mainly comprises a high-pressure cylinder, ultrahigh pressure filter plates, springs, special filter cloths, push boards, back-end auxiliary filter plates, main beams, etc. The press plate frame is provided with a filter frame, filter plates, filter cloths, a chamber, springs and a piston plate; the springs are disposed between the filter frame and the filter plates. The piston plate by which the filter plates can compress the chamber, is disposed between the chamber and the filter plates. The dewatering process is mainly divided into two stages, the first stage is that a feed pump conveying the sludge to the filter chamber makes a solid-liquid separation process with the aid of the pressure thereof, i.e., the primary filtering and dewatering. The second stage is that one end of the machine is fixed, and the other end applies pressure generated from the hydraulic cylinder on filter chambers for squeezing sludge with the aid of elastic force transmission devices (springs), that is the second dewatering. The pressing pressure is about 5-7 MPa, and the ultrahigh pressure pump needs to provide pressure between 25 and 30 MPa, reducing the moisture content of sludge cake to about 50%. Similarly, the ultrahigh pressure elastic filter press changes the volumes of filter chambers for squeezing sludge with the aid of springs. The springs under alternating loads are worn, with fatigue failure occurring in the process of extension and compression, and 10-20 springs with high strength are required between one plate frame and the other, and 50 plate frames require nearly 500-1000 springs; the initial elastic effects of the springs need to be overcome during compression of springs and the actual pressing pressure applied on the sludge at the second stage is less than the pressure provided by the ultrahigh pressure pump. For example, with the feed pressure of 1 MPa, the springs need to provide elastic force of 1 MPa or more to keep the chamber between the filter plates and the filter frame maximum; the feeding process finished, the sludge is squeezed for the second time, and the ultrahigh pressure pump must spend some energy overcoming the elasticity of springs, resulting in the actual pressing pressure applied on the sludge is less than the pressure provided by the ultrahigh pressure pump.

There is also an ultrahigh pressure diaphragm type plate and frame filter press that is the upgraded version of the diaphragm type plate and frame filter press, providing squeezing pressure of nearly 10 MPa by injecting water whose pressure is 10 MPa into the diaphragm, and the process of sludge dewatering also includes two stages of dewatering: the first stage is that the feed pump provides pressing pressure for dewatering, and the second stage is injecting high pressure water into the diaphragm and expanding the diaphragm to squeeze the sludge; the equipment can reduce the moisture content of sludge cake to about 50%. One of the main problems of the equipment is the problem of the diaphragm's short service life under ultrahigh pressure and large deformation.

Each equipment above uses the high-pressure cylinder to provide power for the dewatering of sludge, and a special set of hydraulic systems needs to be configured, and the pressure in the hydraulic system is very high for the advanced dewatering. The filter plates need to be pulled out during discharging sludge, which requires a special plate puller to pull out filter plates one by one. However, the efficiency of drawing filter plates is low and time consuming, which has an impact on the whole working time.

Above the analysis, we can know that it is necessary to realize the variability of the volumes of filter chambers and application of high pressure on sludge. Both the diaphragm type plate and frame filter press and the ultrahigh pressure elastic filter press can change the volumes of filter chambers, but now there are several main problems on the equipment for advanced sludge dewatering:

(1) The pressing pressure of a common diaphragm type plate and frame filter press is small. The pressing pressure of an ultrahigh pressure diaphragm type plate and frame filter press is sufficient, but the ultrahigh pressure diaphragm's service life is short.

(2) The ultrahigh pressure elastic filter press changes the volumes of filter chambers by means of springs that are easy to be damaged and require a lot of pressing pressure.

(3) The greater the pressure, the stronger the sludge cake adhering to the filter cloth, and a dense layer of sludge cake is easily formed on the filter cloth increasing resistance to water discharge, which will affect the performance of dewatering;

(4) Sewage sludge has properties such as high compressibility, high moisture content and difficulties in dewatering caused by capillary water, absorbed water and internal water of the sewage sludge, and it is hard to use only mechanical pressure to achieve the goal of advanced sludge dewatering.

FIG. 1 is a front view of an electromagnetic-force-based dewatering apparatus 100 for sewage sludge reduction. The apparatus comprises a sludge inlet pipe 1, a high-pressure sludge inlet pump 2, a pneumatic ball valve 3, a front-end auxiliary filter plate 7, sealing rings 10, a dust collector 15, a back-end auxiliary filter plate 19, filter plate support lugs 20, reinforced substrate cloth 21, filter cloths 22, sludge inlet pipes 27, drainpipes 25 of middle main filter plates 11 and auxiliary filter plates 9, the control bus 26 and the system controller 28. The dewatering apparatus 100 also includes electromagnetic cores 4, electromagnetic coils 5, intake branch pipes 6, an intake main pipe 8, middle auxiliary filter plates 9, middle main filter plates 11, main connecting rods 12, auxiliary connecting rods 13, retention devices 14, a high-pressure pump 16, rotating shafts 17, hinges 18, connecting pipes 23 of middle main filter plates 11 and auxiliary filter plates 9 and direction-limiting bumps 24. A plurality of electromagnetic cores 4, electromagnetic coils 5 and connecting pipes 23 of middle main filter plates 11 and auxiliary filter plates 9 are disposed between the middle auxiliary filter plates 9 and may constitute a relatively stationary unit.

The main connecting rods 12 are disposed on the rotating shafts 17 of the middle auxiliary filter plates 9 in the odd positions. The auxiliary connecting rods 13 are disposed on the rotating shafts 17 of the middle auxiliary filter plates 9 in the even positions. The main connecting rods 12 and auxiliary connecting rods 13 are connected by hinge. The main connecting rods 12 and the auxiliary connecting rods 13 may form one or more link mechanisms 43. The direction-limiting bumps 24 are on the edge of bosses on two sides of middle main filter plates 11 and auxiliary filter plates 9 and the main connecting rods 12 can only rotate below the direction-limiting bumps 24.

The top of the front-end auxiliary filter plate 7, the middle auxiliary filter plates 9 and the middle main filter plates 11 are provided with air inlets connected with intake branch pipes 6. The middle main filter plates 11 and auxiliary filter plates 9 are provided with through holes. The high-pressure gas generator and its components include the high-pressure pump 16, intake branch pipes 6 and an intake main pipe 8. The intake branch pipes 6 may be hoses and move along with the middle main filter plates 11 and auxiliary filter plates 9. The high-pressure gas enters the filter chambers 39 through the high-pressure pump 16, the intake main pipe 8, intake branch pipes 6 and through holes. The bottom of the front-end auxiliary filter plate 7, the middle auxiliary filter plates 9 and the middle main filter plates 11 are provided with through holes connected with drainpipes 25 of middle main filter plates 11 and auxiliary filter plates 9, and the drainpipes are connected to a main drainpipe whose end is equipped with a solenoid valve.

The apparatus 100 is also provided with the control bus 26 and the system controller 28 to implement the whole auto-control of the system. The pneumatic ball valve 3 connected with the system controller 28 may open and close automatically. The electromagnetic coils 5 and the electromagnetic coils of limit block 14-2 of each filter plate are connected with the system controller 28 via the control bus 26.

The outlet valve (not shown) is a solenoid valve and open and close automatically. The apparatus 100 is also provided with the dust collector 15 that absorbs and removes sludge dust via negative pressure, and the dust collector 15 can be a cloth bag, a cyclone separator or a combination thereof.

Figure 2:
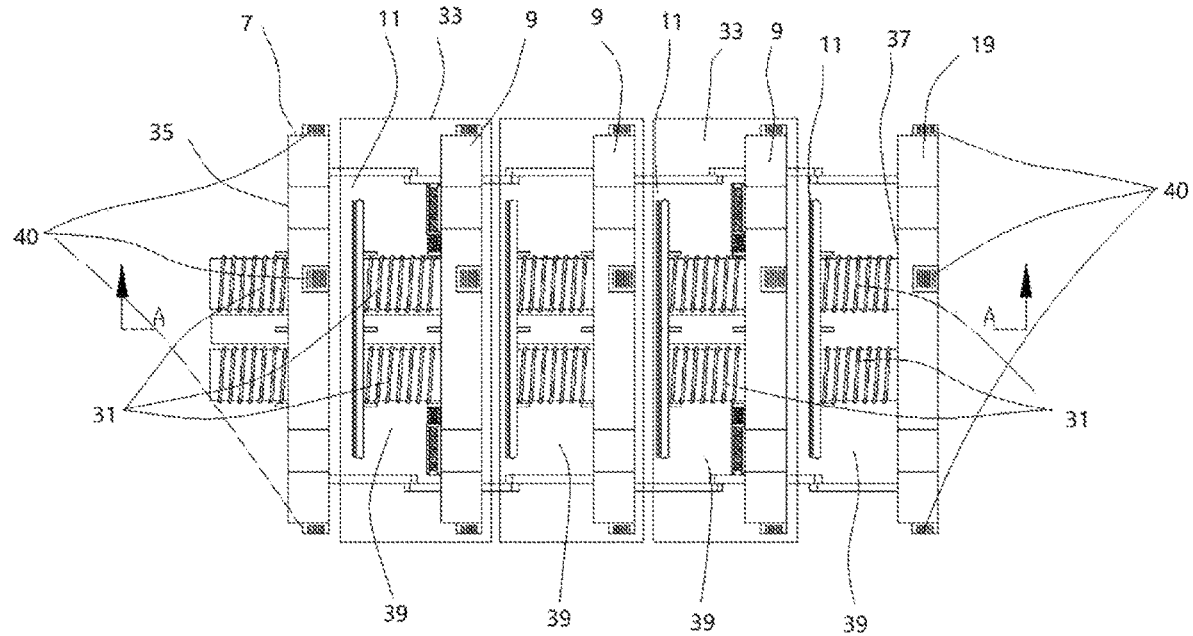
FIG. 2 is a top view of an electromagnetic-force-based dewatering apparatus for sewage sludge reduction according to an embodiment of the present invention.

FIG. 2 is a top view of an electromagnetic-force-based dewatering apparatus 100. A plurality of electromagnetic modules 31 comprise an electromagnetic coil wound around an electromagnetic core 4. The middle main filter plate 11 and the middle auxiliary filter plate 9 are disposed at opposite sides of the electromagnetic modules 31. The outer side 35 of the front-end auxiliary filter plate 7 is provided with the plurality of electromagnetic modules 31. The inner side 37 of the back-end auxiliary filter plate is provided with the plurality of electromagnetic modules 31. The current through the electromagnetic coils 5 is an alternating current whose magnitude and direction can be adjusted. The front-end auxiliary filter plate 7, electromagnetic modules 31, and the pneumatic ball valve 3 are fixedly connected. The back-end auxiliary filter plate 19 and a middle main filter plate 11 are fixedly connected. All the middle auxiliary filter plates 9, the front-end auxiliary filter plate 7 and the back-end auxiliary filter plate 19 are linked together by the main and auxiliary connecting rods. Each of the outer rings of the middle main filter plates 11 is provided with a semicircular groove for mounting a sealing ring 10 whose diameter is smaller than the middle main filter plate 11; the middle auxiliary filter plate 9, the middle main filter plate 11, the sealing ring 10, the reinforced substrate cloth 21 and the filter cloth 22 form an enclosed variable volume chamber; the chamber is used for sludge filter; in a preferred embodiment, the structure of the filter frame is designed as a circle; the structure can also be shaped as a square for any special requirements.

A plurality of filter chambers 39 include the middle main filter plate 11, the middle auxiliary filter plate 9, the reinforced substrate cloth 21 and the filter cloth 22; the middle main filter plates 11 and auxiliary filter plates 9 are provided with annular and linear grooves for water discharging. The through holes formed from connection between upper half part thereof and intake branch pipes 6 and through holes formed from connection between lower half part thereof and drainpipes 25 of middle main filter plates 11 and auxiliary filter plates 9 make the filtrate flow to drainpipes 25 of middle main filter plates 11 and auxiliary filter plates 9. The high-pressure gas may accelerate the flow rate of water while blowing the water on the surface of sludge cake. The middle auxiliary filter plates 9, the front-end auxiliary filter plate 7 and the back-end auxiliary filter plate 19 all have bosses on two sides. The bosses are provided with rotating shafts 17 and direction-limiting bumps 24 for mounting the main connecting rods 12 and limiting their rotation directions. The reinforced substrate cloth 21 wrapped by the filter cloth 22 is fixed on each of the filter plates. The sludge may be discharged from the sludge inlet holes in the central position of middle main and auxiliary filter plates. The reinforced substrate cloths 21 and the filter cloths 22 and sequentially enters the next set of filter chambers 39 between middle main filter plates 11 and auxiliary filter plates 9.

In one embodiment, one or more microwave generators 40 embedded in plates of the front-end auxiliary filter plate 7, auxiliary filter plates 9 and back-end auxiliary filter plate 19.

Figure 3:
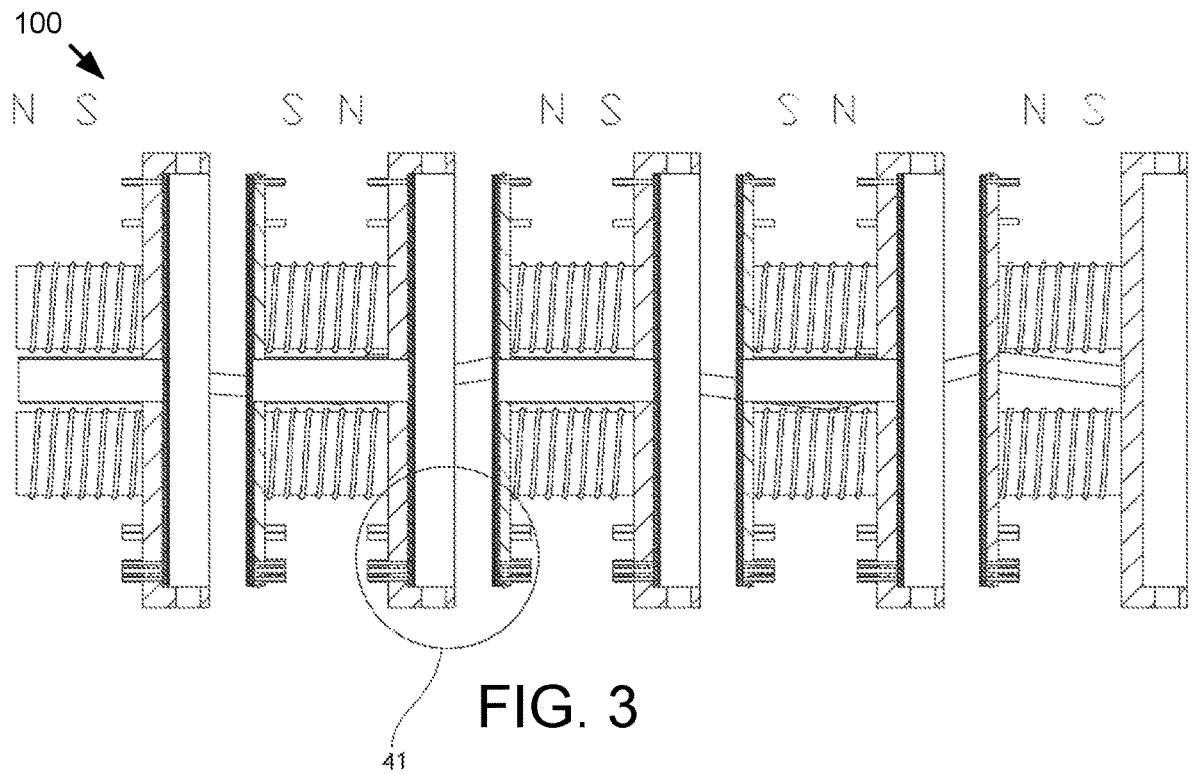
FIG. 3 is a sectional view of an electromagnetic-force-based dewatering apparatus for sewage sludge reduction according to an embodiment of the present invention.

FIG. 3 is a sectional view of an electromagnetic-force-based dewatering apparatus 100 for sewage sludge reduction showing an enlargement area 41.

Figure 4:
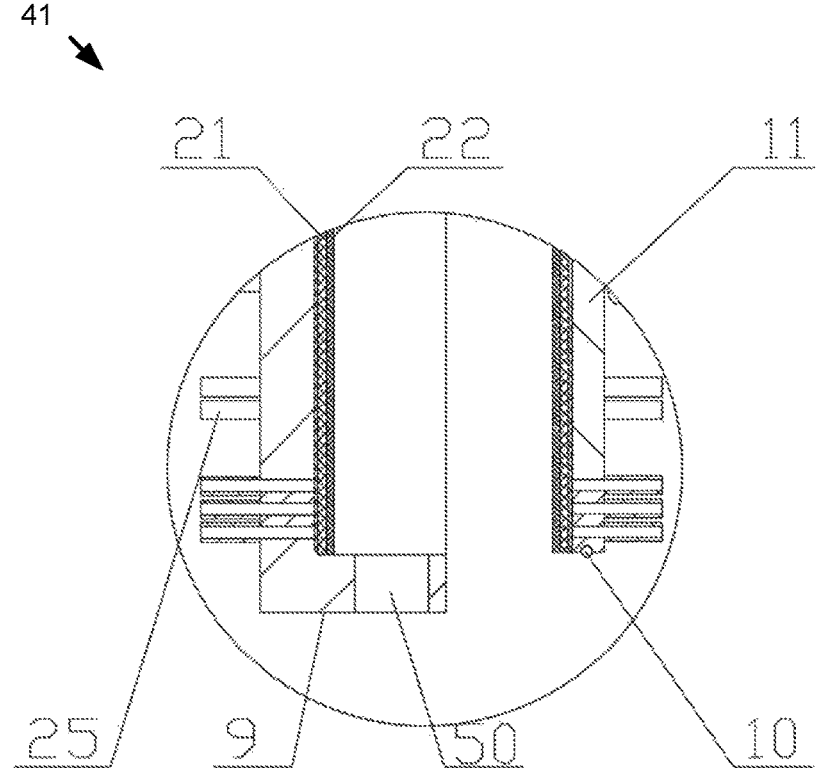
FIG. 4 is a partial enlargement view according to FIG. 3.

FIG. 4 is a partial enlargement view of the enlargement area 41 of FIG. 3. A plurality of microwave acting channels 50 may be provided on every plate of the front-end auxiliary filter plate 7, auxiliary filter plates 9 and back-end auxiliary filter plate 19. A corresponding microwave generator 40 may be arranged on each microwave acting channel 50. The microwave acting channels 50 and microwave generator 40 are uniformly distributed on each plate. The microwave generator 40 is connected with the filter chamber 39. The sludge in the filter chamber 39 may be irradiated and modified by microwaves from the microwave generator 40.

Microwaves from the microwave generators 40 may condition and modify the sludge. In one embodiment, the microwave generator 40 sends microwaves through the microwave acting channels 50 after the filter chamber 39 of sludge is sealed to prevent microwave leakage. The microwaves make the water molecules in the sludge cells rotate at high speed, and the temperature of the sludge increases, which destroys the colloidal structure of the sludge, and makes the sludge particles coarser at the same time. The microwave effect further releases the internal water of the sludge, and improves the dewatering performance. After the sludge is radiated by microwave, it is dewatered by mechanical filtration under the pressure of electromagnetic force.

Figure 5:
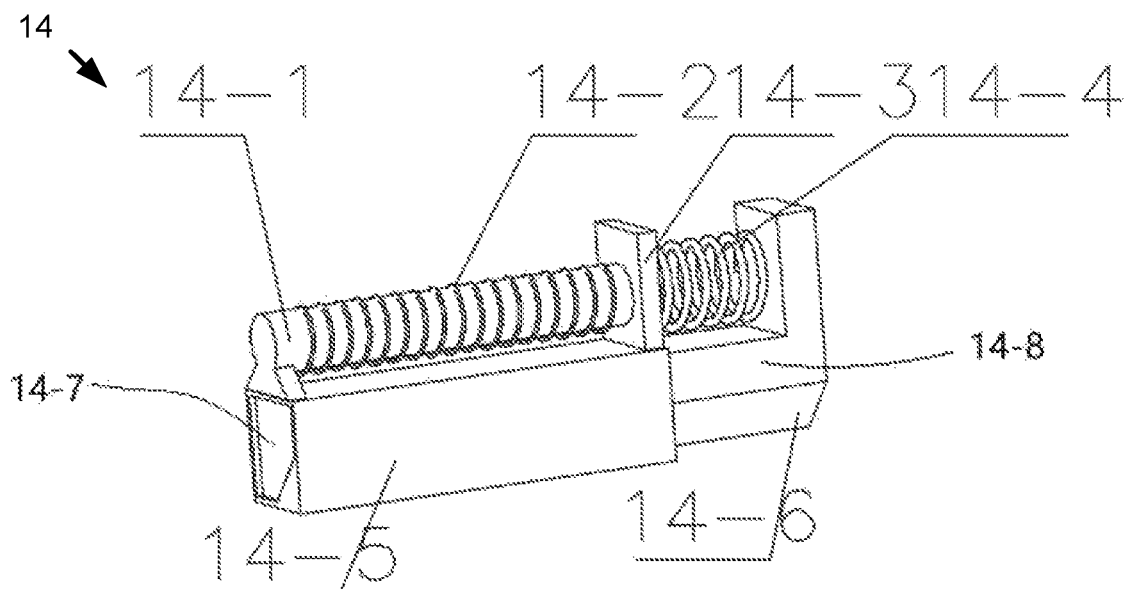
FIG. 5 is a perspective view of the retention device.

FIG. 5 is a perspective view of the retention device 14. The middle auxiliary filter plate 9 in the odd positions is provided with the retention device 14. The retention device 14 comprises a limit block 14-1, an electromagnetic coil 14-2 of the limit block 14-1, a spring baffle 14-3, a reset spring 14-4, a sliding rail 14-5, and a sliding block 14-6. The back 14-7 of the sliding block 14-6 is made of magnetic material. In response to the electromagnetic coil 14-2 of limit block 14-1 being energized, the sliding block 14-6 retracts within the sliding rail 14-5, and the reset spring 14-4 is compressed and the front end 14-7 of the sliding block 14-6 extends out to stop motion of the main connecting rod 12. The sliding rail 14-5 is fixed on a specified position of the middle auxiliary filter plate 9 to ensure that the sliding block 14-6 extended accurately limits the angle of rotation of the main connecting rod 12, indirectly limiting the distance between the middle auxiliary filter plate 9 and the middle main filter plate 11, so as to ensure that the filter chamber 39 remains closed in the sludge inlet process. The electromagnetic core 14-2 of limit block 14-1 is fixed on the sliding block 14-6. The electromagnetic coil 14-2 is connected with the controller 28, receiving switch signals. The spring baffle 14-3 is fixed on the sliding rail 14-5 to ensure that the applied force area of the reset spring 14-4 is sufficient. The reset spring 14-4 is used for connecting the sliding block 14-6 and the sliding rail 14-5 and restores the sliding rail 14-5 to an original withdrawn position after the sliding block 14-6 is extended from the sliding rail 14-5. The back 14-8 of the sliding block 14-6 is magnetic. When the electromagnetic coil 14-2 is energized, the sliding block 14-6 and the sliding rail 14-5 are in relative motion with the back 14-8 moving within the sliding rail 14-5, the reset spring 14-4 is compressed, and the front end 14-7 of the sliding block 14-6 extends out until the rotation of the main connecting rod 12 about the rotating shafts 17 is stopped.

Figure 6:
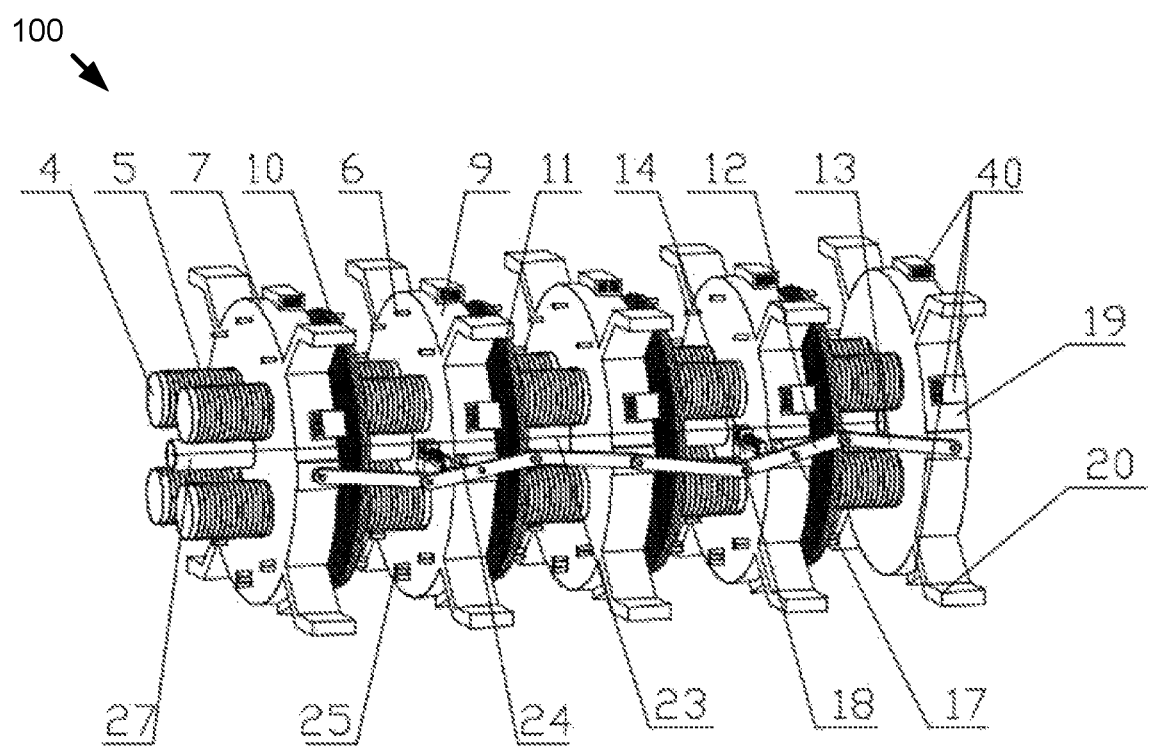
FIG. 6 is a perspective view of an electromagnetic-force-based dewatering apparatus for sewage sludge reduction with chambers open according to an embodiment of the present invention.

FIG. 6 is a perspective view of an electromagnetic-force-based dewatering apparatus 100 for sewage sludge reduction with chambers 39 open.

Figure 7:
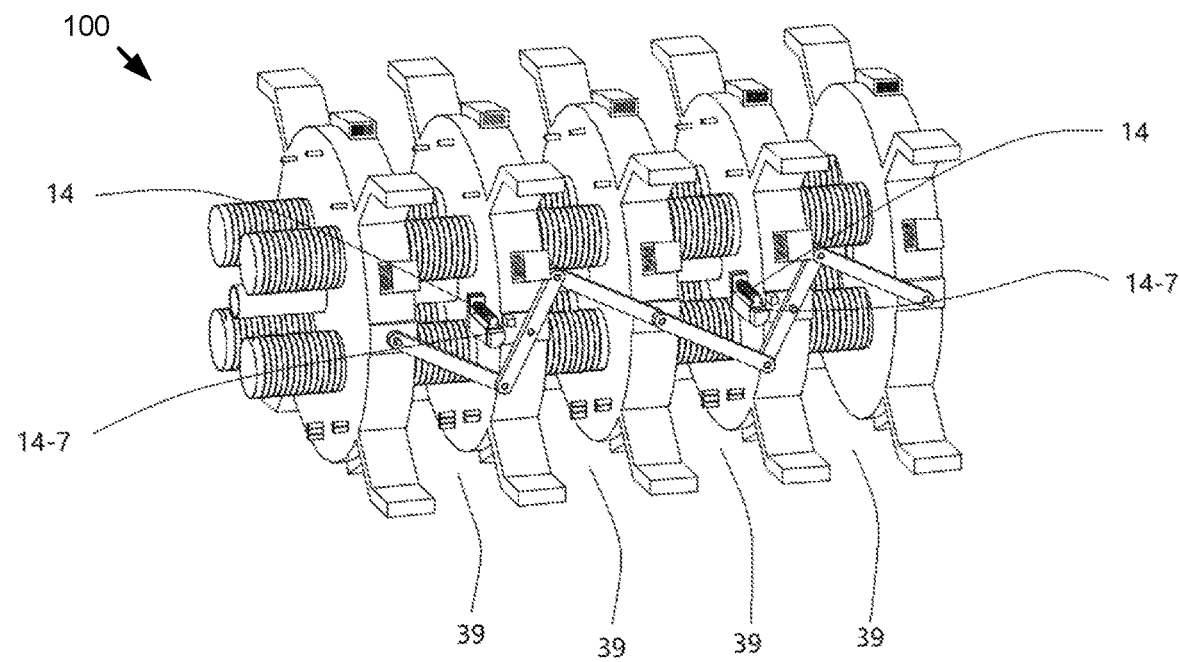
FIG. 7 is a perspective view of an electromagnetic-force-based dewatering apparatus for sewage sludge reduction with chambers close according to an embodiment of the present invention.

FIG. 7 is a perspective view of an electromagnetic-force-based dewatering apparatus for sewage sludge reduction with chambers 39 closed.

Figure 8:
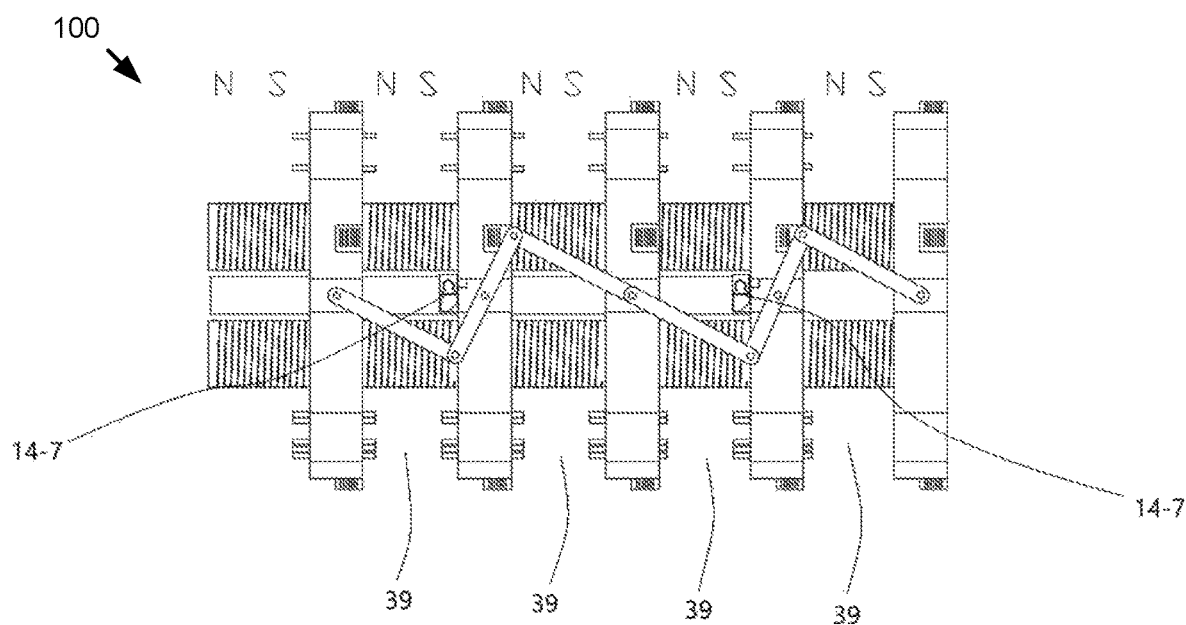
FIG. 8 is a plan view according to FIG. 7.

FIG. 8 is a side view according to FIG. 7.

The working principle of the apparatus is as follows:

For example, the starting state is that all the filter chambers 39 are open, and the controller 28 sends a control information to run a small current through electromagnetic coils 5 until the electromagnetic force generated by the current can pull the middle main filter plates 11 and auxiliary filter plates 9 together. The electromagnetic coils 5 are deenergized, the electromagnetic coils 14-2 are energized, and the front end 14-7 of the sliding blocks 14-6 extend out of the sliding rails 14-5. The pneumatic ball valve 3 opens and sewage sludge is pumped into the first filter chamber 39, and the middle main filter plates 11 and auxiliary filter plates 9 are moved apart by the pressure of the sludge. The first filter chamber 39 becomes larger and larger until the main connecting rod 12 is stopped by the sliding block 14-6, and the size of the filter chamber 39 is fixed, as is the relative position between the middle main filter plates 11 and auxiliary filter plates 9. The size of the filter chamber 39 is the initial volume of the sludge therein. After filling the first filter chamber 39, the sludge enters the second filter chamber 39 and push the middle main filter plate 11 of the second filter chamber 39 to move toward right, and in the same way the two middle main filter plates 11 and auxiliary filter plates 9 are fixed by the main connecting rod 12 and auxiliary connecting rod 13 and the retention device 14, and so on, when the sludge enters the last filter chamber 39, each middle main filter plate 11 and auxiliary filter plate 9 is connected and/or restrained by the main connecting rods 12 and auxiliary connecting rods 13 and the retention devices 14, and the sizes of all the filter chambers 39 reach maximum size. Under the pressure of high-pressure sludge inlet pump 2, sludge on which a pressure ranging from 1.5 to 2.0 MPa is applied is constantly pumped into the filter chambers 39, and water from the sludge comes into the outlet grooves and through holes on the main filter plates 11 and auxiliary filter plates 9 through filter cloths 22 and reinforced substrate cloths 21, and then the water is discharged from the outlet valve, leaving the sludge in the filter chambers 39. After a period of dewatering, the filter chambers 39 are too full to let more sludge in, and then the pneumatic ball valve 3 is closed and the first stage of dewatering ends.

In the second stage of dewatering, a current with the same direction of the first stage current that is far larger than that of the first stage current is sent through electromagnetic coils 5, and the attraction between the main filter plates 11 and auxiliary filter plates 9 may be gradually increased with by increasing the current. Each filter chamber 39 relies on its own electromagnetic attraction between the main filter plates 11 and auxiliary filter plates 9 to squeeze the sludge therein. In the process of the second stage of dewatering, the high-pressure pump 16 starts working under the instruction of the system controller 28, a high pressure gas enters the air inlets and through holes on the main filter plates 11 and auxiliary filter plates 9 via intake branch pipes 6 to blow away the sludge cakes clinging to the filter cloths 22, and the sludge particles are blown away to clean the filter cloths 22. While pressing sludge mechanically, the water in the sludge that is difficult to be mechanically removed is taken away in the form of vapor with the aid of the high-pressure gas. The compression of the main filter plates 11 and auxiliary filter plates 9 may stop when there is almost no water exiting from the outlet valve and the whole dewatering process ends.

When discharging the sludge, the electromagnetic coils 14-2 on the retention devices 14 are deenergized so that the sliding blocks 14-6 will return to their original position as motivated by the reset springs 14-4, then the direction of the current in the electromagnetic coils 5 on the main filter plates 11 and auxiliary filter plates 9 provided with retention devices 14 is reversed, and all the electromagnetic forces in the filter chambers 39 become repulsive forces under which each pair of main filter plates 11 and auxiliary filter plates 9 will be separated, and the sludge from filter chambers 39 falls on a conveying mechanism below the apparatus 100. In this process, the high-pressure pump 16 continues working until the completion of discharging to ensure that the sludge cakes fall from filter chambers 39 and the remaining water in the filter chambers 39 and some water on the surfaces of sludge cakes are blown away. Direction-limiting bumps are disposed on the bosses on two sides of main filter plates 11 and auxiliary filter plates 9 to prevent the main connecting rods 12 from rotating upwards with failure of the inhibiting devices during opening chambers, so that the angles between the main connecting rods 12 and the horizontal line are always small when the sizes of filter chambers 39 reach maximum, which is good for the next rotations and avoids the reverse rotations of the connecting rods. As a result, the operation of one cycle may be completed, and the apparatus 100 returns to the initial states again for the next cycle.

The method of advanced sludge dewatering based on the apparatus 100 has the following steps:

Run a small current through electromagnetic coils 5 until the electromagnetic force generated by the current pulls the main filter plates 11 and auxiliary filter plates 9 together, and the filter chambers 39 are squeezed to minimum sizes.

Deenergize the electromagnetic coils 5, then energize the electromagnetic core 14-2 of the limit block 14-1 motivating the front ends 14-7 of the sliding blocks 14-6 to extend out of the sliding rails 14-5.

The pneumatic ball valve 3 opens and sewage sludge is pumped into the first filter chamber 39, and the main filter plates 11 and auxiliary filter plates 9 are moved apart by the pressure of the sludge. The first filter chamber 39 becomes larger and larger until the main connecting rod 12 is stopped by the front end 14-7 of the sliding block 14-6, and the size of the filter chamber 39 is fixed, as are the relative positions of the main filter plates 11 and auxiliary filter plates 9. The size of the filter chamber 39 is the initial volume of the sludge therein.

After filling the first filter chamber 39, the sludge enters the second filter chamber 39 and pushes the main filter plate 11 of the second filter chamber 39 to move toward right, and in the same way the two main filter plates 11 and auxiliary filter plates 9 are fixed by the main connecting rod 12 and auxiliary connecting rod 13 and the inhibiting device 14, and so on, when the sludge enters the last filter chamber 39, each main filter plate 11 and auxiliary filter plate 9 is connected by the main connecting rods 12 and auxiliary connecting rods 13 and the inhibiting devices 14, and the sizes of all the filter chambers 39 reach maximum size.

The high-pressure sludge inlet pump 2 pumps the sludge, with a pressure ranging from 1.5 to 2.0 MPa, into the filter chambers 39, and water from the sludge comes into the outlet grooves and through holes on the main filter plates 11 and auxiliary filter plates 9 through filter cloths 22 and reinforced substrate cloths 23, and then the water is discharged from the outlet valve, leaving the sludge in the filter chambers 39. After a period of dewatering, the filter chambers 39 are too full to let more sludge in, and the pneumatic ball valve 3 is closed and the first stage of dewatering ends.

In one embodiment, the microwave generator 40 sends microwaves through the microwave acting channels 50. The microwaves release the internal water of the sludge, and improve the dewatering performance.

In the next stage of dewatering, an electric current may be run through the electromagnetic coils 5 to gradually attract the main filter plates 11 and auxiliary filter plates 9. The current may be gradually increased. Each filter chamber 39 relies on its own electromagnetic attraction to squeeze the sludge therein.

(7) The high-pressure pump 16 starts working under the instruction of the system controller 28 and pumps a high-pressure gas through the air inlets and through holes on the main filter plates 11 and auxiliary filter plates 9 via intake branch pipes 6 to blow away the sludge cakes clinging to the filter cloths 22, and the sludge particles are blown away to clean the filter cloths 22.

(8) While pressing sludge mechanically, the water in the sludge that is difficult to be mechanically removed is taken away in the form of vapor with the aid of the high-pressure gas. The compression of the sludge stops when there is almost no water from the outlet valve and the whole dewatering process ends.

When discharging the sludge, the electromagnetic coils 14-2 on the retention devices 14 are deenergized so that the sliding blocks 14-6 will return to their original positions as motivated by the reset springs 14-4. The direction of the current in the electromagnetic coils 5 on the main filter plates 11 and auxiliary filter plates 9 is reversed, and all the electromagnetic forces in the filter chambers 39 become repulsive forces under which each pair of main filter plates 11 and auxiliary filter plates 9 will be separated, and the sludge from chambers falls on the conveying mechanism below the apparatus 100. In this process the high-pressure pump 16 continues working until the dewatered sludge is discharged.

After the completion of discharging, all the main filter plates 11 and auxiliary filter plates 9 return to the initial states again for the next cycle.

It will be apparent to those skilled in the art that modifications and variations can be made without departing from the scope and spirit disclosed by the appended claims of the present disclosure, and such modifications and variations all fall in the protection extent of the claims of the present disclosure.

We claim:

1. An apparatus comprising:
   a front-end auxiliary filter plate;
   a back-end auxiliary filter plate;
   a plurality of filter plate modules disposed between the front-end auxiliary filter plate and the back-end auxiliary filter plate, wherein each of the filter plate modules includes a middle main filter plate, a middle auxiliary filter plate, and a plurality of electromagnetic modules comprising an electromagnetic coil wound around an electromagnetic core, the middle main filter plate and the middle auxiliary filter plate are disposed at opposite sides of the electromagnetic modules, the middle main filter plates of the plurality of filter plate modules face the front-end auxiliary filter plate and the middle auxiliary filter plate of the plurality of filter plate modules face the back-end auxiliary filter plate and there is a consistent one-to-one match between the main filter plates and the auxiliary filter plates that form a plurality of filter chambers into which sewage sludge enters via sludge inlet pipes, wherein the outer side of the front-end auxiliary filter plate and the inner side of the back-end auxiliary filter plate are each provided with the plurality of electromagnetic modules;

a plurality of microwave generators and microwave acting channels embedded in the plurality of filter plate modules, wherein the plurality of microwave generators send microwaves through the microwave acting channels to irradiate the sludge; and wherein an electric current is applied to the electromagnetic coil, attracting the middle auxiliary filter plates and the main filter plates and applying pressure to the sewage sludge.

2. The apparatus of claim 1, wherein the front-end auxiliary filter plate, the middle main filter plates, the middle auxiliary filter plates and the back-end auxiliary filter plate are connected via a link mechanism and can achieve a linkage motion under electromagnetic force.

3. The apparatus of claim 2, wherein the link mechanism comprises main connecting rods and auxiliary connecting rods, the main connecting rods are disposed on the rotating shafts of the middle auxiliary filter plates in the odd positions, the auxiliary connecting rods are disposed on the rotating shafts of the middle auxiliary filter plates in the even positions, and the main and auxiliary connecting rods are connected by hinge.

4. The apparatus of claim 3, wherein the middle auxiliary filter plate in the odd positions is provided with a retention device, and the retention device comprises an electromagnetic core of limit block, an electromagnetic coil of limit block, a spring baffle, a reset spring, a sliding rail and a sliding block, wherein the sliding rail is fixed on the middle filter plate so that the extended sliding block accurately limits the angle of rotation of the main connecting rod, indirectly limiting the distance between the middle auxiliary filter plate and the middle main filter plate, wherein the electromagnetic core of limit block is fixed on the sliding block, the spring baffle is fixed on the sliding rail, and the reset spring withdraws the sliding block within the sliding rail.

5. The apparatus of claim 4, wherein the back of the sliding block is magnetic, and in response to the coil of limit block being energized, the back of the sliding block moves within the sliding rail, the reset spring is compressed, and the front end of the sliding block extends out to stop the main connecting rod.

6. The apparatus of claim 1, wherein each of the outer rings of the middle main filter plates is provided with a seal ring, and a reinforced substrate cloth and a filter cloth are disposed in turn on the middle main filter plate from interior to exterior.

7. The apparatus of claim 1, wherein a plurality of intake branch pipes is connected with the intake main pipe, the plurality of intake branch pipes is correspondingly connected with the plurality of the filter chambers so that the high-pressure gas from intake branch pipes enters the corresponding filter chambers.

8. The apparatus of claim 1, wherein drainpipes for discharging the filtered water are disposed on the front-end auxiliary filter plate and each of the middle main and auxiliary filter plates.

9. The apparatus of claim 1, further comprising a dust collector that absorbs and removes sludge dust via negative pressure.

10. A system comprising:
a front-end auxiliary filter plate;
a back-end auxiliary filter plate;
a plurality of filter plate modules disposed between the front-end auxiliary filter plate and the back-end auxiliary filter plate, wherein each of the filter plate modules includes a middle main filter plate, a middle auxiliary filter plate, and a plurality of electromagnetic modules comprising an electromagnetic coil wound around an electromagnetic core, the middle main filter plate and the middle auxiliary filter plate are disposed at opposite sides of the electromagnetic modules, the middle main filter plates of the plurality of filter plate modules face the front-end auxiliary filter plate and the middle auxiliary filter plate of the plurality of filter plate modules face the back-end auxiliary filter plate and there is a consistent one-to-one match between the main filter plates and the auxiliary filter plates that form a plurality of filter chambers, wherein the outer side of the front-end auxiliary filter plate and the inner side of the back-end auxiliary filter plate are each provided with the plurality of electromagnetic modules;

a high-pressure pump that pumps sewage sludge into the filter chambers via sludge inlet pipes;

a plurality of microwave generators and microwave acting channels embedded in the plurality of filter plate modules, wherein the plurality of microwave generators send microwaves through the microwave acting channels to irradiate the sludge; and wherein an electric current is applied to the electromagnetic coil, attracting the middle auxiliary filter plates and the main filter plates and applying pressure to the sewage sludge; and a high-pressure sludge inlet pump that pumps high-pressure gas through air inlets and through holes on the main filter plates and auxiliary filter plates via intake branch pipes to blow away sludge cakes.

11. The system of claim 10, wherein the front-end auxiliary filter plate, the middle main filter plates, the middle auxiliary filter plates and the back-end auxiliary filter plate are connected via a link mechanism and can achieve a linkage motion under electromagnetic force.

12. The system of claim 11, wherein the link mechanism comprises main connecting rods and auxiliary connecting rods, the main connecting rods are disposed on the rotating shafts of the middle auxiliary filter plates in the odd positions, the auxiliary connecting rods are disposed on the rotating shafts of the middle auxiliary filter plates in the even positions, and the main and auxiliary connecting rods are connected by hinge.

13. The system of claim 12, wherein the middle auxiliary filter plate in the odd positions is provided with a retention device, and the retention device comprises an electromagnetic core of limit block, an electromagnetic coil of limit block, a spring baffle, a reset spring, a sliding rail and a sliding block, wherein the sliding rail is fixed on the middle filter plate so that the extended sliding block accurately limits the angle of rotation of the main connecting rod, indirectly limiting the distance between the middle auxiliary filter plate and the middle main filter plate, wherein the electromagnetic core of limit block is fixed on the sliding block, the spring baffle is fixed on the sliding rail, and the reset spring withdraws the sliding block within the sliding rail.

14. The system of claim 13, wherein the back of the sliding block is magnetic, and in response to the coil of limit block being energized, the back of the sliding block moves within the sliding rail, the reset spring is compressed, and the front end of the sliding block extends out to stop the main connecting rod.

15. The system of claim 10, wherein each of the outer rings of the middle main filter plates is provided with a seal ring, and a reinforced substrate cloth and a filter cloth are disposed in turn on the middle main filter plate from interior to exterior.

16. The system of claim 10, wherein a plurality of intake branch pipes is connected with the intake main pipe, the plurality of intake branch pipes is correspondingly connected with the plurality of the filter chambers so that the high-pressure gas from intake branch pipes enters the corresponding filter chambers.

17. The system of claim 10, wherein drainpipes for discharging the filtered water are disposed on the front-end auxiliary filter plate and each of the middle main and auxiliary filter plates.

18. The system of claim 10, further comprising a dust collector that absorbs and removes sludge dust via negative pressure.

* * * * *